United States Patent Office

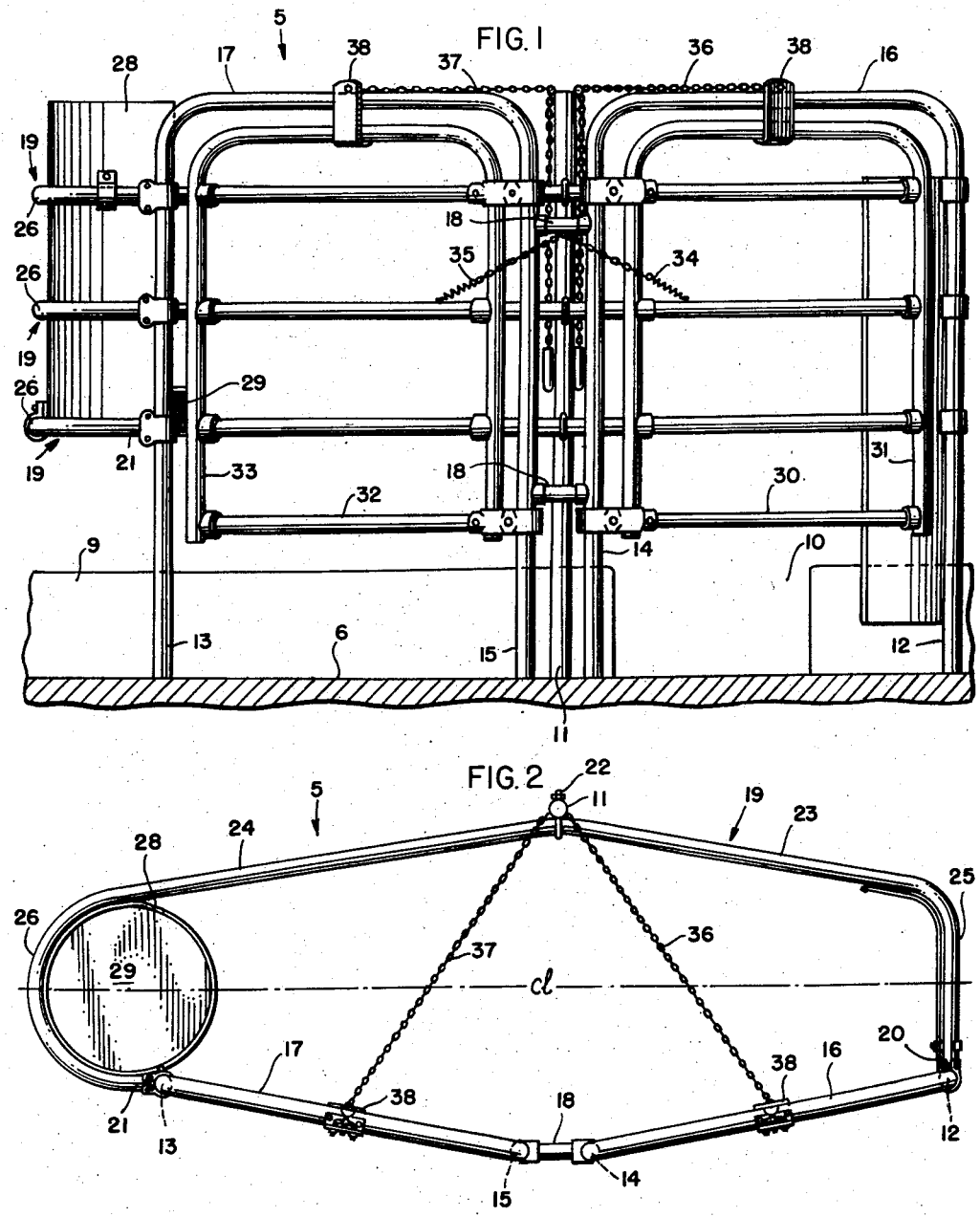

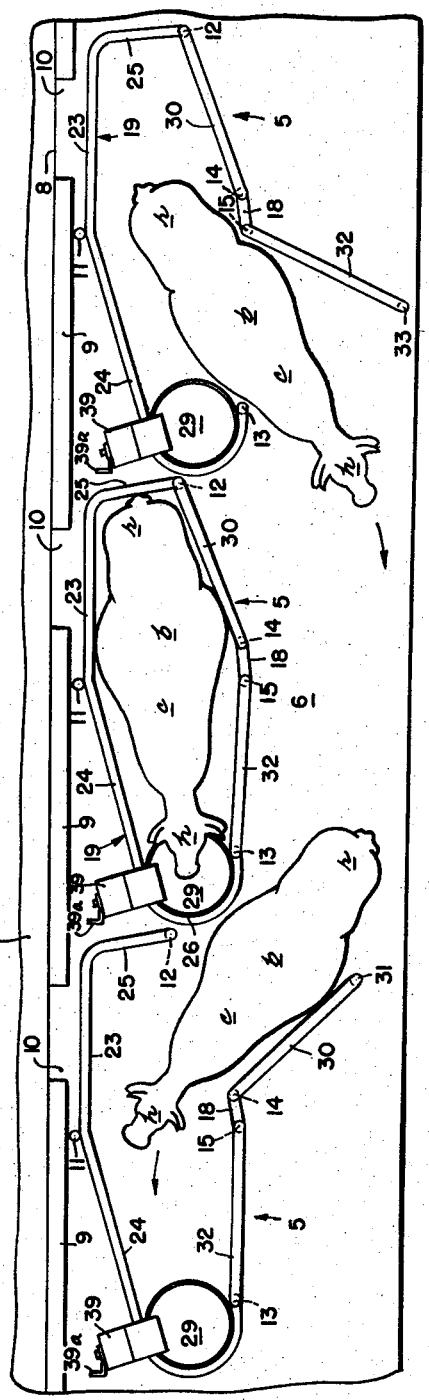

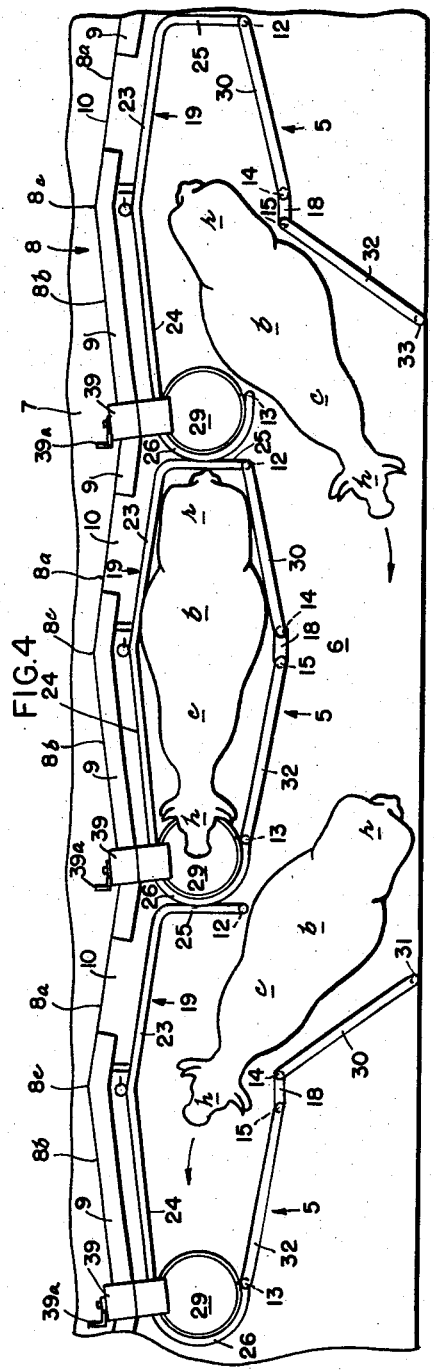

2,904,002
Patented Sept. 15, 1959

2,904,002

PARLOR STALL FOR MILKING AND FEEDING CATTLE

Robert G. Ferris, Harvard, Ill., assignor to Starline, Inc., a corporation of Illinois Application October 14, 1957, Serial No. 689,796

7 Claims. (Cl. 119—27)

This invention relates to a parlor stall for milking and feeding cattle.

Parlor stalls are used almost entirely for machine milking of cattle, and as a rule the milking machine is fastened to a portion of the stall frame. Thus, it is desirable that the cow be as closely confined as possible by the stalls so that she cannot move enough to interfere with operation of the milking machine.

One type of parlor stall has an entrance and an exit gate both at the rear of the stall, with a feed trough in the stall at the end adjacent the exit gate. Such stalls have commonly been made with an enclosure the front portion of which, opposite the gates, is straight so that the front portion may be placed very close and parallel to a common wall which separates the cow stall floor from an operator's alley which is at a lower level.

It is also common to arrange milking parlor stalls generally end to end alongside the operator's alley, and the stall gates are arranged so that they may be manipulated by an operator in the alley to let cows in and out of the several stalls in the milking parlor. Each stall has a feed trough at the exit end, and it is common practice to place a feed metering device alongside the feed trough where the operator may meter the feed for each cow from the operator's alley. He may also handle the milk buckets, teat cups, and other equipment from the operator's alley.

The parlor stall of the present invention eliminates the straight front panel for the stall enclosure which, to the best of applicant's knowledge, has been standard in parlor stall constructions; and instead uses a front enclosure panel means which has two panel portions disposed at a large obtuse angle with respect to each other. Opposite the apex of the angle formed by the front panel portions are closely adjacent posts for the entrance and exit gates, and these gates when closed also form a large obtuse angle which is substantially identical with the angle formed by the front panel portions. The two ends of the stall are made substantially in accordance with the disclosure of Robert G. Ferris, Patent 2,688,309.

The improved stall construction of the present invention differs from previous parlor stalls in that the ground area defined by the stall enclosure is substantially bisected by a plane which passees through the vertical median lines of the two ends of the stall, so that the stall has substantially the same area on the two sides of its longitudinal center line. The widest portion of the stall, across the apexes of the angles formed by the front panel portions and the entrance and exit gates, accommodates the barrel of a cow, while the narrower portions at the two ends of the stall closely confine the cow's rump and head. The symmetrical arrangement permits the stall to be proportioned so as to confine the animal very closely, while permitting her to stand in the stall with her backbone straight. Previous parlor stall constructions either permitted the cow an undesirable degree of movement, or required her to stand in an unnatural, twisted position. The present stall confines the cow even more closely than stalls of the prior art while permitting her to assume a natural position.

The present stall construction also permits an arrangement of the milking parlor which eliminates certain undesirable features which were necessarily found in parlors using stalls having a straight front enclosure panel, and in which the stalls were arranged generally end to end. The feed meters used with the feed boxes for the individual stalls must be at a height where they are easily handled by the operator in the alley; and this places them in such a position that the operator must be careful not to injure himself on them as he moves about in the alley. Some milking parlor layouts minimize the problem of feed meter location by orienting the parlor stalls with their longitudinal center lines in closely parallel planes, and providing the cow floor with a saw tooth wall which runs along the front of a stall and then inwardly along an end of the stall, then makes a right angle turn to go along the front of the next stall. The feed meters may then be positioned at the ends of the stalls where they do not extend into the open traveled part of the operator's alley. Such an arrangement is generally undesirable because it produces corners from which it is difficult to remove refuse for thorough cleaning of the parlor in accordance with sanitary requirements.

The present parlor stall construction may be arranged in a milking parlor in two different ways, either one of which places the feed metering device either entirely out of the traveled part of the operator's alley, or almost entirely out of it. At the same time, the operator's alley may be separated from the cow floor either by a straight common wall portion or by a common wall which forms a succession of obtusely related planes which present no cleaning problem.

In the preferred arrangement, the common upright wall between the cow floor and the operator's alley is straight, and the stalls are oriented with the front panel which is across from the stall entrance gate parallel to the common wall. The obtuse angle between the two front panel portions thus causes the panel portion adjacent the feed box to be angled away from the common wall portion a sufficient distance that the feed metering device may be wholly above the cow floor where it is entirely out of the operator's way but may be easily reached from the alley.

In the second arrangement, the stalls are placed upon a common longitudinal center line; and the common wall which separates the operator's alley from the cow floor is formed with a succession of obtusely related planes each of which is very close and substantially parallel to the immediately adjacent front panel portion of a stall. This construction results in shallow recesses adjacent the feed boxes on the successive stalls, and the angle of the stall front wall panels is such that almost the entire feed metering device is on the cow floor side of a vertical plane which passes through the most outwardly projecting parts of the common margin.

The invention is illustrated in the accompanying drawings in which:

Fig. 1 is a rear elevational view of a cow stall constructed in accordance with the present invention;

Fig. 2 is a plan view of such a cow stall;

Fig. 3 is a diagrammatic plan view of the preferred parlor stall arrangement with a feed metering device in place, and showing the positions of cows entering, leaving and confined in the stalls;

Fig. 4 is a diagrammatic plan view of the alternative form of parlor arrangement.

Referring to the drawings in greater detail, and referring first to Figs. 1 and 2, a cow stall indicated generally at 5 is positioned on a cow floor 6 which is separated from an operator's alley 7, which is usually at a lower level than the cow floor, by a common upright margin or wall 8. Extending along the edge of the cow floor 6 is an upstanding curb 9 which has an opening 10 through which an operator in the alley 7 may readily apply the teat cups of a milking machine to the teats of a cow in the stall.

The stall takes the form of an enclosure which is supported on a center post 11 at the front of the stall, an entrance corner post 12, an exit corner post 13, an entrance gate post 14, and an exit gate post 15, all of which are set in the concrete cow floor 6. Conveniently, the corner post 12 and gate post 14 are the upright sides of an entrance gate arch 16, while the corner post 13 and the gate post 15 form the uprights of an exit gate arch 17. The gate posts 14 and 15 are connected by a pair of suitable short center rails 18.

The body of the stall is formed by three parallel horizontal rails, indicated generally at 19, each of which is shaped in a particular manner so that its ends 20 and 21 may be secured, respectively, to the corner posts 12 and 13 while its intermediate portion extends through a U bolt 22 by means of which it is secured to the center post 11.

Each of the rails 19 is bent to provide a first front panel portion 23 which is opposite the entrance arch 16 and a second front panel portion 24 which is opposite the exit arch 17, and these front panel portions are disposed at a large obtuse angle with respect to one another, the apex of the angle being at the U bolt 22 by means of which the rail is clamped to the center post 11. The portion of the rail 19 adjacent the first front panel 23 is bent to form a straight end panel portion 25 which terminates in the end portion 20 secured to the corner post 12. At the opposite end of the rail 19, the front panel portion 24 merges into an arcuate enclosure 26 which has one side 27 forming a straight, or substantially straight projection of the front panel portion 24, while the other side of the arcuate portion 26 terminates in the end portion 21 which is secured to the corner post 13. Thus, the arcuate enclosure 26 may support a shield 28 and feed box 29.

Hung on the gate post 14 in the entrance gate arch 16 is an entrance gate 30 the free side 31 of which closes against, or immediately adjacent the corner post 12; and hung on the gate post 15 in the exit gate arch 17 is an exit gate 32 the free side 33 of which closes against or adjacent the corner post 13. Thus, the gates are pivoted on adjacent upright axes. The term "adjacent axes" is used herein to mean either "next to" or "co-axial"; as it is obvious that the structural principle of the stall is the same whether the gates are on separate posts or a single post.

As seen in Fig. 1, the gate 30 is provided with a chain and spring unit 34, while the gate 32 is provided with a chain and spring unit 35 which tend to open said gates. From the center post 11 a cable or chain 36 may be used to operate the gate 30, and a similar cable or chain 37 may be used to operate the gate 32. Each gate has a latch mechanism, indicated generally at 38, which latches it to the top of its gate arch. This latch mechanism may conveniently be of the type disclosed in Ferris Patent 2,668,381, although others may be used.

Fig. 2 in the drawings is provided with a dot dash line *cl* which is the longitudinal center line of the parlor stall; and it is seen that the stall is almost entirely symmetrical with respect to the center line *cl*, and that the center post 11 is directly opposite the middle of the center rail 18. Thus the apex of the obtuse angle formed by the gate arches 16 and 17 is directly opposite the apex of the angle formed by the front panel portions 23 and 24. The ground area enclosed by the parlor stall may be described as having the form of a rectangle which is flanked by a pair of triangles the heights of which are very small relative to the lengths of their bases.

Considering the rectangular area bounded by a line intersecting the corner posts 12 and 13 and a line parallel to said line which intersects the front panel portions 23 and 24 directly opposite the corner posts, each of the triangular areas has a height which is not quite half the width of the rectangle; so that the parlor stall 5 is almost twice as wide as its central area as it is at the two ends. Thus, as seen in Figs. 3 and 4, each stall 5 may accommodate the barrel *b* of a cow C at its wide central area, while the rump *r* of the cow is closely confined by the relatively narrow span between the first front panel portion 23 and the entrance gate 30, while the cow's head *h* is positioned comfortably above the feed box 29.

The improved parlor stall of the present invention is readily adaptable to two unique milking parlor arrangements which are illustrated in Figs. 3 and 4.

In the preferred arrangement of Fig. 3, the common margin or wall 8 between cow floor 6 and the operator's alley 7 is straight from end to end, and the stalls 5 are set with the first front panel portion 23 parallel to the common margin 8, so that as seen in Fig. 3 said first front panel portions 23 of all the stalls are longitudinally aligned with one another. Thus, when a cow C is confined in a stall 5, as is the case with the center stall of Fig. 3, the cow's udder is close enough to the operator's alley 7 that the operator may readily reach the teats for attachment of the teat cups.

The angle of the second front panel portion 24 with respect to the portion 23 is such that the feed box 29 is a substantial distance from the common wall 8 and curbing 9, so that a feed metering device 39 mounted above the rails 19 is entirely to the cow floor side of the common margin 8. Thus, while the handle 39a of the feed metering device is readily accessible to the operator standing in the alley 7, the feed metering device is entirely clear of the alley and out of the way.

In the alternative parlor arrangement illustrated in Fig. 4, the parlor stalls 5 are positioned on a common center line, so that they are in a true tandem arrangement instead of the modified tandem arrangement of Fig. 3. In this case it is necessary to form the common margin or wall 8 between the cow floor 6 and the operator's alley 7 in such a way that the portion of the common margin 8a which is adjacent the first front panel 23 of each stall is generally parallel to said front panel. Thus, the relationship between the side of the operator's alley 7 and the cow C confined in a stall 5 is the same as it is in the preferred arrangement of Fig. 3. Connecting the common wall portions 8a are wall portions 8b which are parallel to the second front panels 24 of the stalls 5, so that as seen in Fig. 4 the common margin or wall forms a succession of obtusely related planes 8a and 8b.

In this parlor arrangement, the feed metering devices 39 for the stalls 5 project into the operator's alley 7, but due to the undulating, or flat zigzag form of the common margin between the alley and the cow floor 6, the metering devices 39 are substantially entirely to the cow floor side of the line connecting the apexes 8c of the obtusely related wall segments 8a and 8b adjacent a single cow stall 5. Thus, while the feed metering device extends into the operator's alley, it is out of the normal traveled part of the alley, and the operator is unlikely to bump himself on it. The apexes 8c of the common margin are the points nearest the center posts 11 of the stalls, and thus are also the points at which the common margin is nearest to the apexes of the front panel angles of all the stalls.

Comparison of Figs. 3 and 4 makes it apparent that in both arrangements the feed metering device is substantially entirely to the cow floor side of a vertical plane which connects those portions of the common margin which are nearest the apexes of the front panel angles of all the stalls. Thus, whether the common margin is straight as seen in Fig. 3 or consists of a succession of obtusely related planes as seen in Fig. 4, the feed metering devices 39 are entirely, or substantially entirely out of the way of the operator as he moves about in the alley 7, while being readily accessible to him.

The foregoing detailed description is given for clearness of understanding only and no unnecessary limitations should be understood therefrom, as modifications will be obvious to those skilled in the art.

I claim:

1. A parlor stall for milking and feeding cattle, comprising: an enclosure which is relatively narrow at its two end portions and substantially wider in a central area, said enclosure having a pair of gates at one side which have hinged sides on adjacent upright axes for outward swinging movement, and free sides, said gates when closed having their hinged sides farther from the longitudinal center line of the stall than are said free sides, and front panel means opposite said gates, the front panel means being farther from said center line in said central area and closer to said line near said end portions said enclosure being substantially symmetrical with respect to its longitudinal center line, said central area being adapted to accommodate the barrel of a cow while said end portions closely confine the cow's rump and head.

2. The parlor stall of claim 1 in which the central area of enclosure is nearly twice the width of the end portions.

3. A parlor stall for milking and feeding cattle, comprising: an enclosure which is relatively narrow at its two end portions and substantially wider in a central area, said enclosure having a pair of gates at one side which are hinged on adjacent upright axes for outward swinging movement, and front panel means opposite said gate, the area of said enclosure consisting of a generally rectangular middle portion extending from end to end of the enclosure, and flanking said middle portion two identical portions generally in the form of isoscles triangles the heights of which are small relative to their bases, and said area being of such size that the area between the apexes of said triangles accommodates the barrel of a cow while the end portions of the enclosure closely confine a cow's rump and head.

4. The parlor stall of claim 3 in which the height of each triangle is no more than about half the length of the narrow side of the rectangle.

5. A parlor stall for milking and feeding cattle, comprising: an enclosure which is relatively narrow at its two end portions and substantially wider in a central area, said enclosure having a pair of front panel portions disposed in the form of a large obtuse angle, and a pair of gates which are hinged on adjacent, upright axes for outward swinging movement, said gates in closed position forming a large obtuse angle substantially equal and directly opposed to that of said front panel portions, and said stall between the apexes of said opposed angles being wide enough to accommodate the barrel of a cow while the narrower end portions of said stall closely confine the rump and head of a cow.

6. A parlor stall for milking and feeding cattle, comprising: a pair of upright corner posts; upright gate post means in a plane substantially parallel to, and spaced laterally from a plane passing through said corner posts, said gate post means being substantially equidistant from said corner posts; an upright center post substantially equidistant from said corner posts, said center post and said gate post means being on opposite sides of said plane, and said center post being substantially farther from said plane than is said gate post means; a pair of gates hinged on said gate post means to swing their free sides outwardly from said corner posts; and a plurality of horizontal enclosure rails supported on said corner posts and said center post, each of said rails having a front portion which forms a large obtuse angle with its apex secured to the inner side of the center post and its ends substantially in a common plane opposite the corner posts, said common plane being substantially the same distance from said center post as the plane of the corner posts is from the gate post means, and each of said rails having integral end portions joining the front portion to the adjacent corner post, the dimensions of said stall being such as to accommodate the barrel of a cow between the gate posts and the center post while closely confining a cow's rump and head in the areas adjacent the corner posts.

7. The parlor stall of claim 6 in which one end portion of the enclosure rails is straight and the other end portion defines an area to receive a feed box, said area having one side which is substantially a continuation of the front portion of the rail and a side which is in the plane of the corner posts.

References Cited in the file of this patent

UNITED STATES PATENTS

| | | |
|---|---|---|
| 2,198,048 | Babson et al. | Apr. 23, 1940 |
| 2,587,846 | Hodson | Mar. 4, 1952 |
| 2,617,382 | Duncan | Nov. 11, 1952 |
| 2,688,309 | Ferris | Sept. 7, 1954 |
| 2,726,635 | Ferris | Dec. 13, 1955 |
| 2,740,377 | Duncan | Apr. 3, 1956 |